United States Patent
Holzhauer

(10) Patent No.: US 9,566,660 B2
(45) Date of Patent: Feb. 14, 2017

(54) RESISTANCE WELDING ELECTRODE

(75) Inventor: Anton Holzhauer, Sigmaringendorf (DE)

(73) Assignee: HOLZHAUER GMBH & CO. KG, Sigmaringenorf (DE)

( * ) Notice: Subject to any disclaimer, the term of this patent is extended or adjusted under 35 U.S.C. 154(b) by 256 days.

(21) Appl. No.: 13/119,069

(22) PCT Filed: Oct. 5, 2009

(86) PCT No.: PCT/EP2009/007107
§ 371 (c)(1),
(2), (4) Date: Mar. 15, 2011

(87) PCT Pub. No.: WO2010/040488
PCT Pub. Date: Apr. 15, 2010

(65) Prior Publication Data
US 2011/0168680 A1    Jul. 14, 2011

(30) Foreign Application Priority Data

Oct. 6, 2008 (DE) .................. 10 2008 050 567
Oct. 1, 2009 (DE) .................. 10 2009 047 920

(51) Int. Cl.
*B23K 11/30* (2006.01)

(52) U.S. Cl.
CPC .................. *B23K 11/3018* (2013.01)

(58) Field of Classification Search
USPC . 219/119, 120, 85.16, 69.1, 76.14; 408/238, 239 R
IPC ............ B23K 35/02,35/04, 11/30, 11/31
See application file for complete search history.

(56) References Cited

U.S. PATENT DOCUMENTS

| 2,774,859 | A | * | 12/1956 | Johnson | B23K 11/3018 |
| | | | | | 219/120 |
| 4,514,612 | A | * | 4/1985 | Nied | 219/119 |
| 4,728,765 | A | * | 3/1988 | Prucher | 219/120 |
| 4,760,235 | A | * | 7/1988 | Flater | 219/119 |
| 5,387,774 | A | | 2/1995 | Boyer et al. | |
| 6,011,237 | A | * | 1/2000 | Yang | 219/119 |
| 6,355,901 | B1 | * | 3/2002 | Nippert | 219/119 |
| 6,825,436 | B1 | * | 11/2004 | Aoyama et al. | 219/117.1 |
| 7,265,313 | B2 | * | 9/2007 | Stevenson et al. | 219/120 |
| 7,538,294 | B2 | * | 5/2009 | Scotchmer | 219/119 |
| 2008/0131223 | A1 | * | 6/2008 | Jauch | 408/204 |

FOREIGN PATENT DOCUMENTS

DE    101 48 035 B4    4/2003
WO    WO 03/028936    4/2003

* cited by examiner

*Primary Examiner* — David Angwin
*Assistant Examiner* — Amit K Singh
(74) *Attorney, Agent, or Firm* — Henry M. Feiereisen LLC

(57) ABSTRACT

A resistance welding electrode includes a shaft-shaped holder and an electrode part in the form of an electrode cap or a pin electrode which are non-positively connected via tapered surfaces. Furthermore, cooling bores are also present. In such a resistance welding electrode the tapered cone angle is in a region of about 1 degree to 3 degrees and the holder and the electrode part are connected such that the holder and the electrode part are further in axial contact with each other via a radial surface contact, and the edge of the electrode part facing the holder is restrained in an associated reception recess on the holder side by means of reduction.

15 Claims, 5 Drawing Sheets

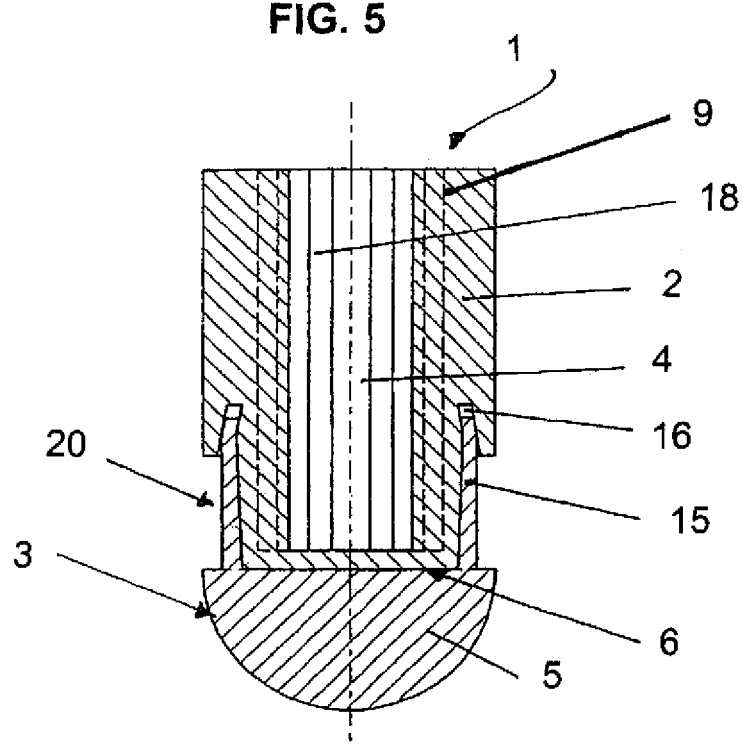

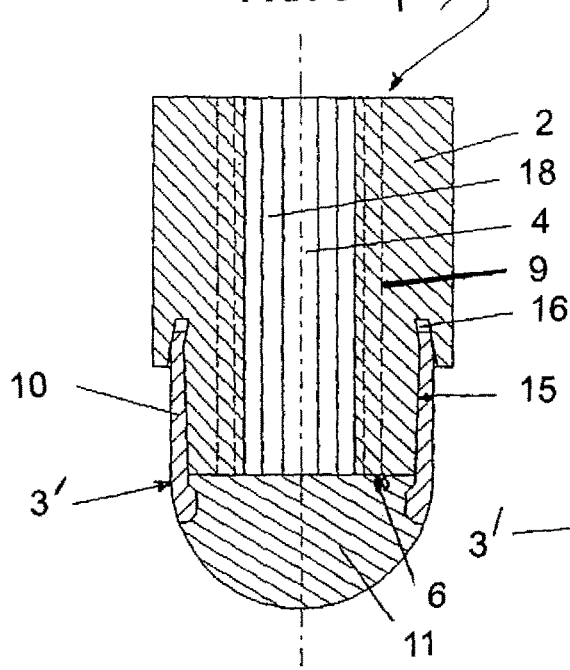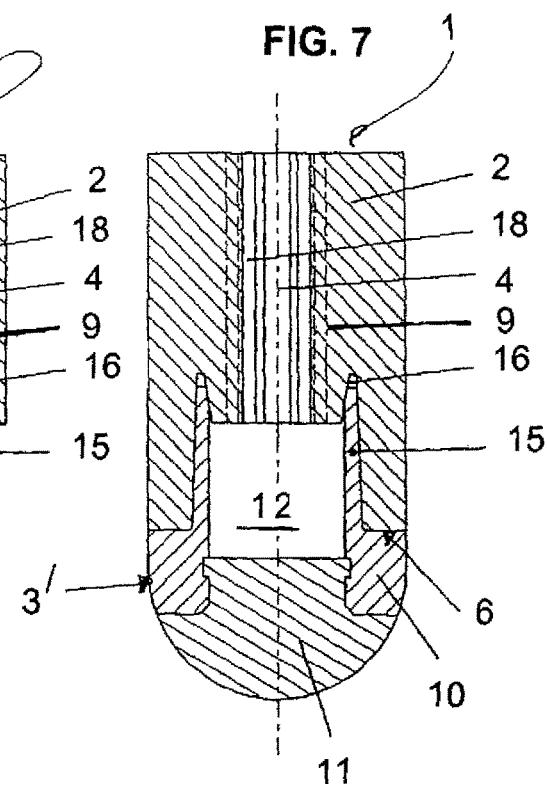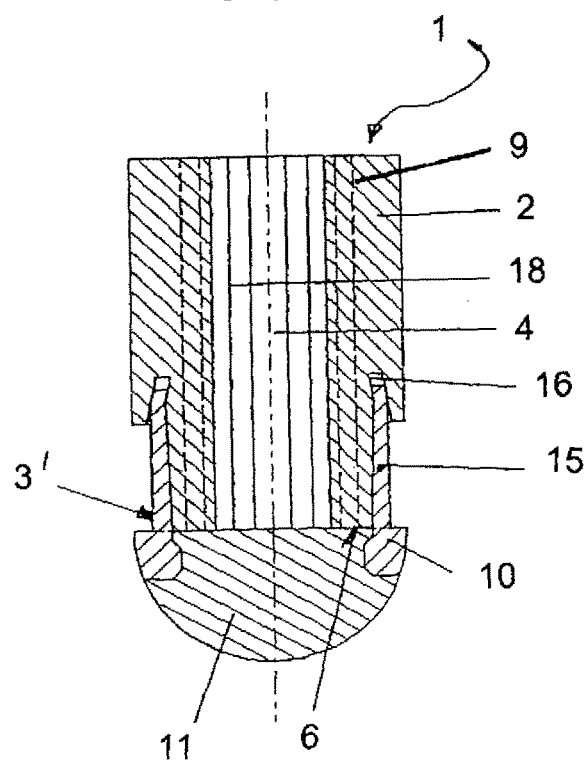

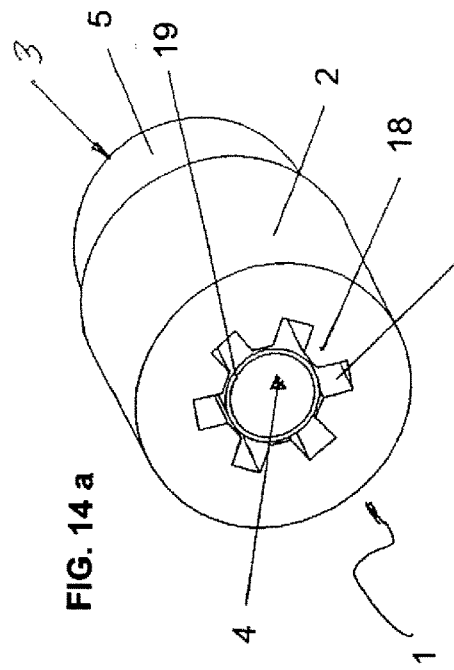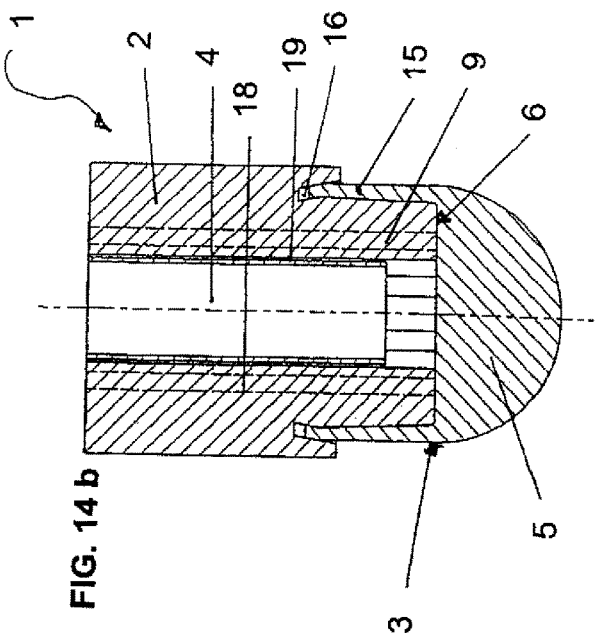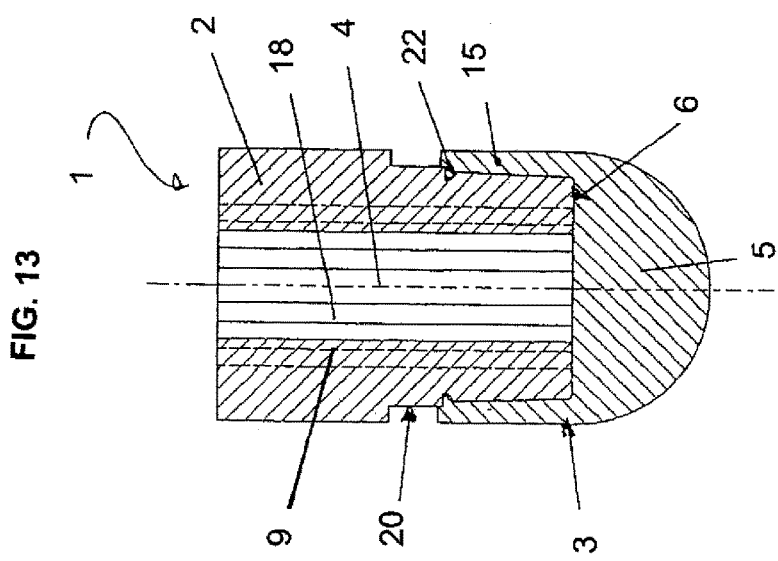

RESISTANCE WELDING ELECTRODE

CROSS-REFERENCES TO RELATED APPLICATIONS

This application is the U.S. National Stage of International Application No. PCT/EP2009/007107, filed Oct. 5, 2009, which designated the United States and has been published as International Publication No. WO 2010/040488 and which claims the priority of German Patent Applications, Serial No. 10 2008 050 567.6, filed Oct. 6, 2008, and Serial No. 10 2009 047 920.1, filed Oct. 1, 2009, pursuant to 35 U.S.C. 119(a)-(d).

BACKGROUND OF THE INVENTION

The invention relates to a resistance welding electrode, which has a shaft-shaped holder and an electrode part. The electrode part can be constructed in form of an electrode cap (female) or a rod electrode (male). The respective electrode part is non-positively connected with the associated holder via matching conical surfaces. Optionally, a cooling bore can be provided for a high-performance application.

In conventional welding electrodes of this type, a cone angle of 4 to 7 degrees is used to create the non-positive connection between the holder and electrode part. An interference fit connection is then produced between the holder and the electrode part via the matching conical surfaces. For tolerance reasons, the respective electrode parts must be spaced apart in the axial direction from the respective associated end faces of the holder, so that a gap is present instead of a direct contact to guarantee a tight seat of the electrode part on the holder. Due to the cone angle, this interference fit connection is established with a relatively small relative axial movement between the holder and the associated electrode part. During force transmission, in particular with the pressing force applied during welding by this type of resistance welding electrode, the electrode part can dig into the holder and form bead-shaped peripheral protrusions on the holder. When the electrode parts need to be exchanged, difficulties can arise, such as leaks, a poor interference fit and the risk that the electrode part becomes detached from the holder, as well as an increased consumption of holders which have relatively high manufacturing costs. Additional cost due to lost production can also occur.

DE 101 48 035 B4 discloses an apparatus for resistance welding of workpieces, wherein a welding electrode includes an electrode body, to which an electrode cap is attached or can be attached. The drawing suggests, assuming that the illustration is to scale, that the electrode cap which is placed on the electrode body makes axial contact with the holder via a radial contact surface. Otherwise, the conventional approach is mainly directed to a solution for obtaining information of interest about the electrode temperature more reliably and more cost-effectively. To this end, the welding apparatus has measurement means for measuring the temperature which advantageously reliably measure the temperature of the electrode body and/or the temperature of the electrode cap.

SUMMARY OF THE INVENTION

It is an object of the invention to provide a resistance welding electrode which provides a readily manufacturable and reliable interference fit between holder and electrode part with improved force transmission and current transmission characteristics, as well as to attain an economical and material-saving application of such resistance welding electrodes.

According to the invention, a resistance welding electrode with a shaft-shaped holder and an electrode part in form of an electrode cap or a rod electrode is provided, which are non-positively connected via conical surfaces and which have at least one cooling bore. In this resistance welding electrode, the cone angle of the conical surfaces is in a range of about 1° to about 3°. The holder and the electrode part are joined in such a way that the holder and the electrode part are additionally in mutual axial contact via a radial contact surface, with the edge of the electrode point facing the holder being forced into an associated receiving recess on the holder side through reducing.

With the design according to the invention, a very small cone angle is selected; additionally, according to the invention, in case of an electrode cap (female), the axial surface of the holder meets the bottom of the bore in the electrode part, whereas in case of a rod electrode (male), the axial surface of the holder meets the outer shoulder or the inner stop face. Accordingly, with the design according to the invention, the force is reliably introduced and transmitted in the axial direction, as is the current. With the axial contact between holder and electrode part provided via a substantially radially extending surface, large forces can be transmitted without introducing deformations, such as the formation of beads or deformations on the holder of the resistance welding electrode. With the small cone angles, substantial relative movements occur when the holder and the electrode part are joined at the contact surfaces between holder and electrode part. Due to the additional contact surface, higher axial pressing forces can be generated, which is advantageous in particular with high-strength metal sheets or press-hardened metal sheets. The dimensions of the electrode part can also be reduced, yielding significant material savings during operation. The manufacturing and material costs can thus be reduced. Because this resistance welding electrode uses thin-walled parts, a forced cooling with at least one centrally arranged cooling bore is provided.

Preferably, the cooling bore does not pass through the electrode cap, but instead terminates in the holder, i.e., it does also not extend all the way through the holder. This is advantageous when changing the electrode part because cooling fluid is prevented from leaking from the cooling channels or cooling bores.

The cooling bore is provided with cooling fins for attaining particularly intensive and enhanced forced cooling.

According to a preferred embodiment of the resistance welding electrode, a cooling tube is inserted in the center of the interior space of the holder formed by the cooling fins. The cooling fins have the additional benefit of securely holding the cooling tube in the center of this interior space, thereby ensuring a very uniform and effective cooling along the periphery of the resistance welding electrode. It can also be inferred that the cooling fins reduce thermal stress on the holder. The holder can then be manufactured from less expensive, for example electrolytic copper material which, however, has a higher thermal and electrical conductivity.

According to another preferred embodiment of the invention, the electrode part may have a relatively thin wall thickness. This produces additional material savings while maintaining the same performance of the resistance welding electrode.

Preferably, the resistance welding electrode according to the invention is designed so that the side of the electrode part facing the holder is constructed as a stripping aid, with a circumferential recess being formed between the holder and the electrode part to serve as a gripper seat. This design facilitates exchange of the electrode part.

Preferably, the electrode part has an additional axial cooling bore. This enhances and improves cooling while reducing material usage.

To attain a more secure interference fit between electrode part and holder, in an alternative embodiment, an additional locking mechanism which operates non-positively and positively is arranged between the electrode part and the holder. This additional locking mechanism operates as a seal and prevents leakage of the cooling fluid.

Preferably, the resistance welding electrode may be designed as a composite electrode part designed without being restricted to the use of a single material; instead, different materials can be suitably selected for the respective application and operation. This advantageously reduces the costs for the resistance welding electrode while simultaneously improving its performance.

According to a preferred embodiment of the invention, the composite electrode part includes a sleeve, preferably made of a softer and less expensive material, and an insert connected to the sleeve by clinching and made of a high-performance material and/or a special material. When the composite electrode part is constructed in this manner, a softer material can be selected, for example, for the sleeve, which in conjunction with the holder limits the risk of damage to the material, while high-performance and hence more expensive special material is used in the respective areas for the actual welding operation of the resistance welding electrode. More particularly, with this type of composite electrode construction, the materials of holder and insert can be easily separated, thereby improving recyclability.

Advantageously, with the resistance welding electrode according to the invention, the holder transmits the pressing force for the resistance welding operation and the welding current substantially directly to the insert made of high-performance material. This results in a substantially direct and hence low-loss force transmission and current transmission.

Preferably, the insert made of the high-performance material may have an additional axial bore. The quantity of the employed high-performance material can thus be reduced, while at the same time improving the cooling efficiency.

Preferably, in a resistance welding electrode constructed as a composite electrode part, the insert made of a high-performance material engages only the regions relevant for welding, i.e., the regions that cooperate with the welded piece. Particular high-performance resistance welding electrodes can thereby be produced cost-effectively and with low material consumption through a most favorable material selection.

Additional details, features and advantages of the invention are described in the following description of preferred embodiments with reference to the appended drawing, which illustrate non-limiting examples.

BRIEF DESCRIPTION OF THE DRAWING

The figures of the drawing show the following:

FIG. 5 is a schematic axial cross-sectional view of a modified embodiment of an electrode part in form of an electrode cap, based on the embodiment according to FIG. 3;

FIG. 6 to FIG. 12 are schematic axial cross-sectional views for illustrating preferred embodiments of the composite electrodes in form of electrode caps (female) and rod electrodes (male);

FIG. 13 is a schematic axial cross-sectional view of an alternative exemplary embodiment of the resistance welding electrode according to the invention, showing additional cooling for an electrode cap; and FIG. 14a and FIG. 14b show schematic views of an additional embodiment of the resistance welding electrode according to the invention to illustrate preferred design details for enhanced and efficient cooling of the resistance welding electrode.

DETAILED DESCRIPTION OF PREFERRED EMBODIMENTS

Figure 1:
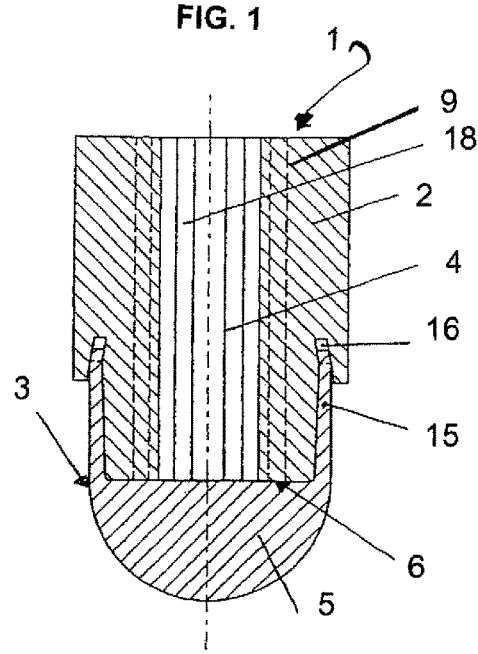
FIG. 1 to FIG. 3 are various embodiments of a resistance welding electrode in form of an electrode cap (female) shown in schematic axial cross-sectional views.

The resistance welding electrodes 1 in all embodiments of resistance welding electrodes illustrated in the Figures are indicated with the general reference symbol 1. The resistance welding electrode 1 includes a shaft-shaped holder 2 and an electrode part having the general reference symbol 3. The electrode part can be designed in form of an electrode cap 5 (female embodiment) or in form of a rod electrode 7 (male embodiment). Composites electrodes 3' can also be provided in other described embodiments of the resistance welding electrode 1.

The respective shaft-shaped holder shown with the general reference symbol 2 has at least one cooling bore 4 which is preferably provided with cooling fins 18. The electrode cap 5 or the rod electrode 7 is connected with the shaft-shaped holder 2 via conical surfaces. These conical surfaces have a cone angle ranging from about 1° to about 3°. Moreover, the holder 2 and the electrode part 3 and/or 3' are joined such that the holder 2 and the electrode part 3 and/or 3' make additional axial contact via a radial support surface 6. To achieve a secure interference fit of the electrode part 3 and/or 3' on the shaft-shaped holder 2, the edge 15 of the electrode part 3 and/or 3' which faces the holder 2 is forced into an associated receiving recess 16 on the holder side by reducing. A reliable interference fit of the electrode part 3 and/or 3' on the holder 2 is thereby attained, without the risk of causing damage or deformation on the holder 2.

With this construction having a cone angle ranging from about 1° to 3°, an interference fit between the holder 2 and the electrode part 3 and/or 3' is produced over a relatively large axial distance during press-joining. The radial support surface 6, on which the holder and the electrode part 3 and/or 3' make additional axial contact with each other, forms a kind of stop when these two parts are press-joined. This axial surface contact makes it possible to transmit and receive a relatively large force, a so-called pressing force or its reaction force, so that this design according to the invention can also withstand relatively large applied forces. A deformation of the holder 2 under load at its outer peripheral surface or at the connecting surface with the electrode part 3 and/or 3' can thus be largely prevented, thereby extending the service life of the holder 2.

Figure 2:
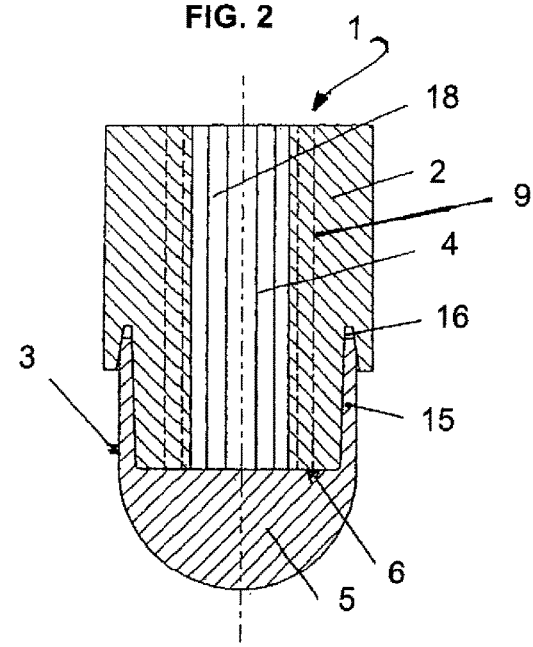
Figure 3:
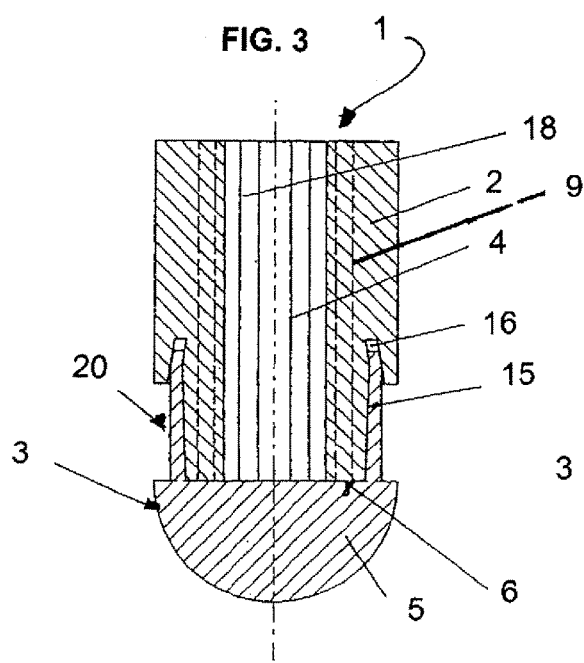

All embodiments according to FIGS. 1 to 3 relate to the configuration of a resistance welding electrode 1 with an electrode cap as the electrode part 3. In the embodiment according to FIG. 2, the edge 15 of the electrode cap 5 is forced into the associated receiving recess 16 on the holder by reducing and pressing. The reception opening 16 on the holder side in FIG. 1 is constructed to form a kind of undercut, into which the edge 15 of the electrode cap 5 is not only forced, but also crimped toward the undercut holder 2. The properties of the interference fit connection between electrode cap 5 and holder 2 can thus be made more resilient.

FIG. 3 shows a modified embodiment which is based on FIG. 1, wherein a circumferential recess 20 is arranged between electrode cap 5 and the holder 2, in which a gripper of an unillustrated cap changer can be inserted to strip, if necessary, the electrode cap 5 from the holder 2, if the electrode cap 5 needs to be replaced. The stripping process during a possible change of the electrode part 3 can be assisted with this measure, allowing the changer to generate a sufficiently large force and the associated gripper to reliably strip the electrode part 3 from the shaft part.

Figure 4:
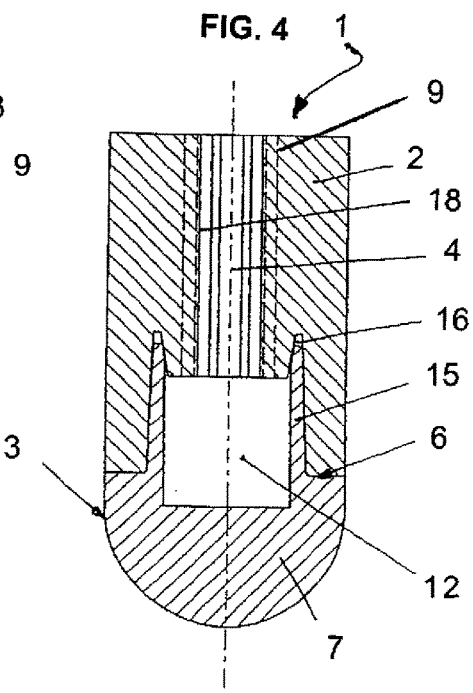
FIG. 4 is a schematic axial cross-sectional view of a resistance welding electrode with an electrode part in form of a rod electrode (male)

FIG. 4 shows a resistance welding electrode 1 wherein the electrode part 3 is constructed as a rod electrode 7. This embodiment also employs the radial support surface 6; in addition, the rod electrode 7 has a protruding edge, here shown with the reference symbol 15, which is forced into an associated receiving recess 16 on the holder side by reducing. The rod electrode 7 also includes an additional bore 12 to enhance cooling.

FIG. 5 shows a resistance welding electrode 1 similar to the embodiment depicted in FIG. 3. In this embodiment according to FIG. 5, the cooling bore 4 does not pass completely through the holder 2, but terminates in the holder 2 without extending completely through the holder 2. In this way, leakage of coolant during a change of the electrode can be effectively prevented.

FIGS. 6 to 12 show various embodiments of a resistance welding electrode 1 wherein the electrode part is constructed as a composite electrode part 3'. These composite electrode parts 3' are not constructed from the same material, but are assembled from several components and produced from different selectable materials, depending on the requirements. With respect to improved recyclability, the components made of different materials can be easily, cleanly and reliably separated by a simple process. To this end, the components of the composite electrode part 3' are only non-positively and positively connected with each other.

In all illustrated composite electrode parts 3' a sleeve 10 is provided which is preferably made of a softer and less expensive material and which therefore has properties to protect the shaft. An insert 11 made of a high-performance material or a special material can be riveted to this sleeve 10. The design is selected such that the pressing force and the welding current required for resistance welding are transmitted directly from the holder 2 to the insert 11 made of the high-performance material. In the various embodiments illustrated in all the Figures, the composite electrode part 3' is designed such that the insert 11 made of high-performance material includes only the region relevant for welding, i.e., the region where the electrode part 3' comes into contact or cooperates with the welded piece. With this design of a composite electrode part 3', the manufacturing costs of such resistance welding electrodes can be reduced, in particular, due to significant savings in material, because only those regions of the electrode part 3' are made of high-grade and expensive special material which are directly and operatively involved in the welding process. Less expensive materials can be used for all other regions of the composite electrode part 3'.

FIG. 6 shows a composite electrode part 3' in form of an electrode cap (female), and FIG. 7 shows an embodiment where the composite electrode part 3' is formed as a rod electrode 7 (male). FIG. 8 shows an embodiment which is similar to the embodiment of FIG. 3 and includes a corresponding stripping aid.

Figure 9:
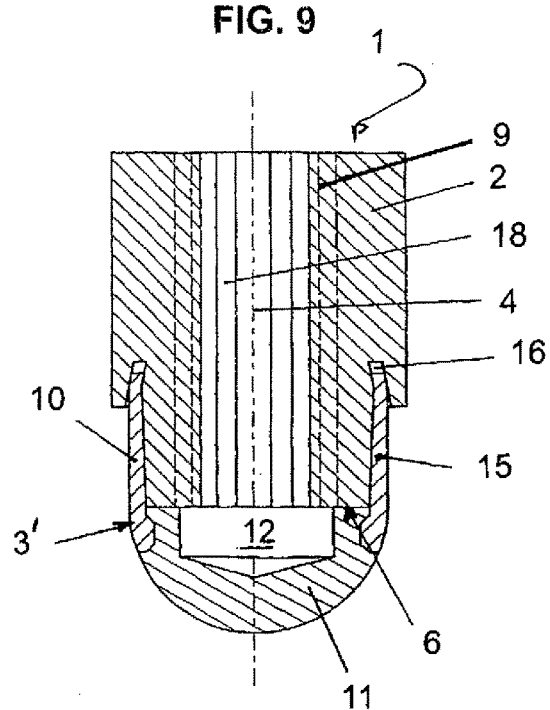
Figure 10:
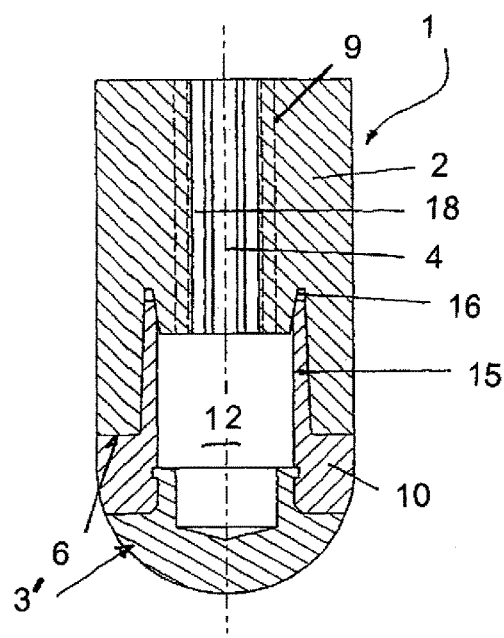

FIGS. 9 and 10 each show composite electrode parts 3' with an additional cooling bore 12 is the region of the insert 11 made of the high-performance material. FIG. 9 shows as composite electrode part 3' an electrode cap 5, while FIG. 10 shows a rod electrode 7.

Figure 11:
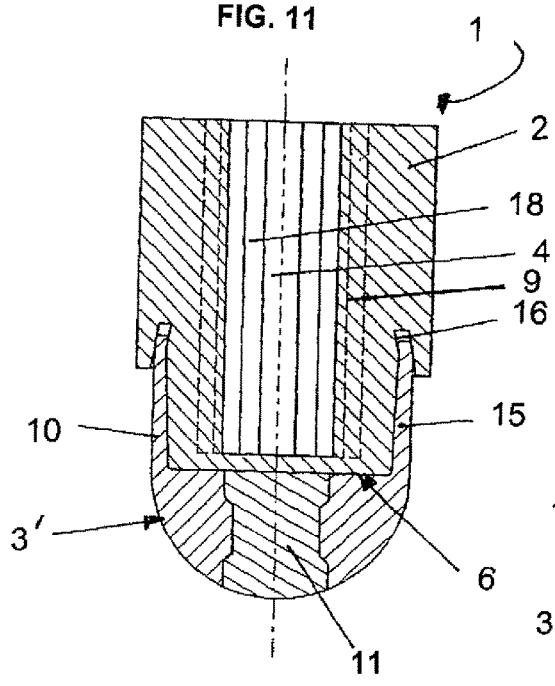
Figure 12:
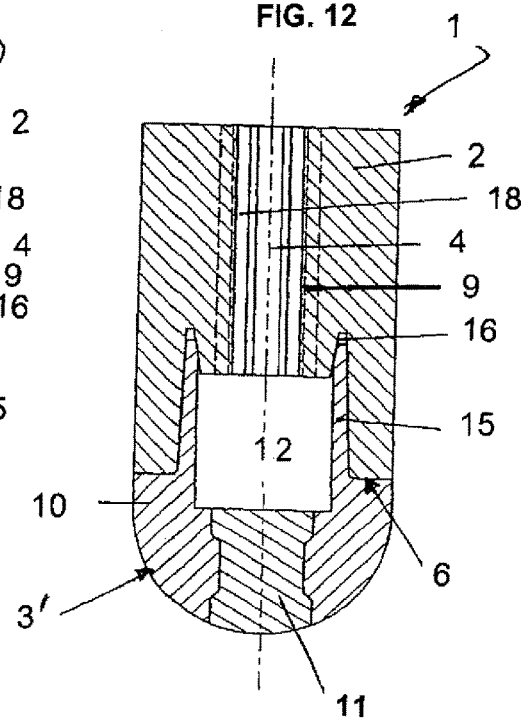

FIGS. 11 and 12 each show composite electrode parts 3' to illustrate additional material savings for the insert 11 made of special material. The composite electrode part 3' illustrated in FIG. 11 is formed as an electrode cap 5, whereas the composite electrode 3' illustrated in FIG. 12 is formed as a rod electrode 7. Like in FIG. 5, the cooling bore 4 with the cooling fins 18 in FIG. 11 does not extend completely through the holder 2 in order to prevent leakage of cooling fluid if the composite electrode part 3' needs to be changed.

FIG. 13 shows a modified embodiment of the resistance welding electrode 1. Illustrated is an exemplary additional interlock 22 which operates radially non-positively and positively in order to attain a more secure interference fit between holder 2 and electrode part 3. This can produce savings in machining costs on the holder 2 and the electrode part 3.

FIGS. 14*a* and 14*b* illustrate a resistance welding electrode shown in the example of FIG. 1 with more clearly illustrated details for implementing enhanced, more intensive and more efficient cooling. As the Figures show, the cooling bore 4 has cooling fins 18, as already described above. A cooling tube 19 is inserted in the center of the interior space of the holder formed by the cooling bore 4 and the cooling fins 18. The cooling fins 18 therefore hold the tube 19 in the center. With this combination of cooling fins 18 and this cooling arrangement, the holder is presumably subjected to only small thermal stress. The holder 2 can therefore be manufactured from less expensive, but thermally and electrically better conducting material, for example electrolytic copper.

This type of cooling of a resistance welding electrode 1 according to the invention, as illustrated in FIGS. 14*a* and 14*b*, can obviously be implemented in an identical or similar manner also in an electrode part 3 in form of a rod electrode 7 or in form of a composite electrode part 3'. All the cooling bores 4 illustrated and described above can hence be designed in the same manner as illustrated in FIGS. 14*a* and 14*b*.

It will be understood that the invention is not limited to the aforedescribed details discussed with reference to the preferred embodiments, but that numerous changes and modifications are possible which a person of skill in the art may implement without deviating from the inventive concept.

In particular, it is important in the design of the resistance welding electrode 1 according to the invention to provide a very small cone angle of up to about 3° on the shaft-shaped holder 2 when joining the electrode part 3 and/or 3'. With respect to optimization of the force transmission characteristics and the current transmission characteristics, a radial support surface is disposed at the boundary surface between the electrode part 3 and/or 3' and the holder 2, which maintains the holder and the electrode part 3 and/or 3' in actual contact with each other. To ensure a reliable interference fit between the electrode part 3 and/or 3' and the holder 2, a protruding edge 15 of the electrode part 3 and/or 3' is provided, which is forced into an associated receiving recess 16 on the holder side at least by reducing. With his deformation, the electrode part 3 and/or 3' is securely held on the holder 2.

According to another aspect according to the invention, a configuration of the composite electrode part 3' is proposed which conserves resources and reduces the cost for materials by assembling the electrode part 3' from several components. This composite electrode part 3' has at least one sleeve 10 made of a softer and less expensive material, which is non-positively and positively connected with an insert 11 made of a high-performance material or a special material.

The invention claimed is:

1. A resistance welding electrode comprising:
a shaft-shaped holder having an annular wall with a conical blind receiving recess formed inside the wall and increasingly reducing up to a bottom of the recess; and
an electrode part including an electrode cap and a rod electrode, said electrode part having an annular circumferential lip facing the holder, wherein the electrode part and the holder are configured so that they are removably connected with one another by inserting the annular circumferential lip into the conical blind receiving recess formed inside the wall of the holder so that the annular circumferential lip reduces, and press-joining establishing an interference fit between an outer conical surface of the annular circumferential lip of the electrode part and an inner conical surface adjoining the conical blind receiving recess in the wall of the holder having a cone angle in a range of about 1 to about 3 degrees, with the annular circumferential lip of the electrode part contacting the holder being restrained in the conical blind receiving recess disposed in the holder through conical deformation of the annular circumferential lip inside the conical blind receiving recess as a result of the press-joining so as to retain the electrode part on the holder, and wherein the electrode part and the holder have at least one cooling bore, wherein the holder and the electrode part are additionally in axial contact with each other via a radial support surface which forms a stop when the holder and the electrode part are press-joined.

2. The resistance welding electrode of claim 1, wherein the at least one cooling bore in the electrode cap terminates in the holder without extending fully through the holder.

3. The resistance welding electrode of claim 1, wherein the cooling bore comprises cooling fins.

4. The resistance welding electrode of claim 3, further comprising a cooling tube attached at a center of an interior space of the holder which is formed by the cooling fins.

5. The resistance welding electrode of claim 1, wherein a width of the annular circumferential lip of the electrode part is greater than a width of the receiving recess disposed in the holder, thereby radially compressing the annular circumferential lip inside the receiving recess when the holder and the electrode part are press-joined.

6. The resistance welding electrode of claim 1, wherein a circumferential recess is formed between the holder and the electrode part, said recess forming a gripper seat configured as a stripping aid.

7. The resistance welding electrode of claim 1, wherein an additional locking mechanism is disposed between the electrode part and the holder, said additional locking mechanism operating non-positively and positively.

8. The resistance welding electrode of claim 1, wherein the electrode part is formed as a composite electrode part.

9. The resistance welding electrode of claim 8, wherein the composite electrode part comprises a sleeve and an insert riveted to the sleeve, said insert made of a high-performance material.

10. The resistance welding electrode of claim 9, wherein the sleeve is made of a material that is softer and less expensive than a material of the insert.

11. The resistance welding electrode of claim 9, wherein the holder transmits a pressing force for resistance welding and a welding current substantially directly axially onto the insert made of the high-performance material.

12. The resistance welding electrode of claim 9, wherein the insert made of the high-performance material includes an additional axial bore.

13. The resistance welding electrode of claim 9, wherein the insert made of the high-performance material is disposed in regions of the electrode part that cooperate with a part to be welded.

14. The resistance welding electrode of claim 8, wherein for improved recyclability the parts of the composite electrode part are only non-positively and positively connected with one another.

15. A resistance welding electrode comprising:
a shaft-shaped holder having an annular wall with a conical blind receiving recess formed inside the wall and increasingly reducing up to a bottom of the recess;
an electrode part including an electrode cap and a rod electrode, said electrode part having an annular circumferential lip facing the holder, wherein the electrode part and the holder are configured so that they are removably connected with one another by inserting the annular circumferential lip into the conical blind receiving recess formed inside the wall of the holder so that the annular circumferential lip reduces, and press-joining establishing an interference fit between an outer conical surface of the annular circumferential lip of the electrode part and an inner conical surface adjoining the conical blind receiving recess in the wall of the holder having a cone angle in a range of about 1 to about 3 degrees, with the annular circumferential lip of the electrode part contacting the holder being restrained in the conical blind receiving recess disposed in the holder through conical deformation of the annular circumferential lip inside the conical blind receiving recess as a result of the press-joining so as to retain the electrode part on the holder, and wherein the electrode part and the holder have at least one cooling bore, wherein the holder and the electrode part are additionally in axial contact with each other via a radial support surface which forms a stop when the holder and the electrode part are press-joined,
wherein the at least one cooling bore in the electrode cap terminates in the holder without extending fully through the holder and comprises cooling fins;
a cooling tube attached at a center of an interior space of the holder which is formed by the cooling fins,
wherein a width of the annular circumferential lip of the electrode part is greater than a width of the receiving recess disposed in the holder, thereby radially compressing the annular circumferential lip inside the receiving recess when the holder and the electrode part are press-joined, and
wherein a circumferential recess is formed between the holder and the electrode part, said recess forming a gripper seat configured as a stripping aid.

* * * * *